(12) United States Patent
Liao et al.

(10) Patent No.: US 12,065,769 B2
(45) Date of Patent: Aug. 20, 2024

(54) BIODEGRADABLE ADDITIVE, BIODEGRADABLE POLYESTER FIBER AND METHOD FOR PRODUCING THE SAME, AND BIODEGRADABLE FABRIC

(71) Applicant: NAN YA PLASTICS CORPORATION, Taipei (TW)

(72) Inventors: Te-Chao Liao, Taipei (TW); Sen-Huang Hsu, Taipei (TW); Chia-Sheng Lai, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 2 days.

(21) Appl. No.: 17/394,534

(22) Filed: Aug. 5, 2021

(65) Prior Publication Data
US 2022/0267936 A1   Aug. 25, 2022

(30) Foreign Application Priority Data

Feb. 24, 2021   (TW) .................................. 110106420

(51) Int. Cl.
| D03D 15/50 | (2021.01) |
| D01D 5/10 | (2006.01) |
| D03D 15/283 | (2021.01) |

(52) U.S. Cl.
CPC .............. *D03D 15/50* (2021.01); *D01D 5/10* (2013.01); *D03D 15/283* (2021.01); *D10B 2331/041* (2013.01); *D10B 2401/12* (2013.01)

(58) Field of Classification Search
USPC ........................................................ 442/365
See application file for complete search history.

(56) References Cited

U.S. PATENT DOCUMENTS

| 5,962,131 | A | * | 10/1999 | Schwind | ............... | C08F 222/04 |
| | | | | | | 264/177.17 |
| 2017/0292209 | A1 | * | 10/2017 | Lee | ............... | D01D 5/08 |
| 2019/0390020 | A1 | * | 12/2019 | Ferris | ............... | A41D 31/06 |

FOREIGN PATENT DOCUMENTS

| CN | 102372911 A | 3/2012 |
| CN | 109322002 A | 2/2019 |
| TW | 201514245 A | 4/2015 |
| TW | 202001019 A | 1/2020 |

OTHER PUBLICATIONS

Gregory DR. Improving Properties and Processing Performance of Melt-Spun Fibers. International Nonwovens Journal. 2000;os-9(3). pp. 15-21. doi:10.1177/1558925000OS-900305 (Year: 2000).*

* cited by examiner

*Primary Examiner* — Marla D McConnell
*Assistant Examiner* — Kevin Worrell
(74) *Attorney, Agent, or Firm* — Li & Cai Intellectual Property (USA) Office

(57) ABSTRACT

A biodegradable additive, a biodegradable polyester fiber and a method for producing the same, and a biodegradable fabric are provided. The biodegradable additive includes a polyester resin material and a biodegradable resin material. The biodegradable resin material is at least one material selected from the group consisting of polybutylene succinate (PBS), polybutylene adipate terephthalate (PBAT), polycaprolactone (PCL), polylactic acid (PLA), and derivatives thereof. In the biodegradable additive, a content range of the polyester resin material is between 40 wt % and 80 wt %, and a content range of the biodegradable resin material is between 20 wt % and 60 wt %.

6 Claims, 2 Drawing Sheets

BIODEGRADABLE ADDITIVE, BIODEGRADABLE POLYESTER FIBER AND METHOD FOR PRODUCING THE SAME, AND BIODEGRADABLE FABRIC

CROSS-REFERENCE TO RELATED PATENT APPLICATION

This application claims the benefit of priority to Taiwan Patent Application No. 110106420, filed on Feb. 24, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a biodegradable additive, and more particularly to a biodegradable additive, a biodegradable polyester fiber and a method for producing the same, and a biodegradable fabric.

BACKGROUND OF THE DISCLOSURE

In the conventional technology, starch, polylactic acid, and fibrous protein are three main types of biodegradable plastic materials. Conventional biodegradable plastic materials generally do not contain traditional plastic materials, such as polyester (PET), polyethylene (PE), polypropylene (PP), polystyrene (PS), and polyvinyl chloride (PVC). Furthermore, methods for producing and using the conventional biodegradable plastic materials are almost the same as those for the traditional plastic materials.

Furthermore, in an aerobic environment, the biodegradable plastic materials can be decomposed into carbon dioxide and water by an action of aerobic organisms, water, oxygen and other substances in the soil. In an anaerobic environment, the biodegradable plastic materials can be decomposed into carbon dioxide and methane by an action of anaerobic organisms, water and other substances in the soil.

However, some physical and chemical properties of the biodegradable plastic materials in the conventional technology are inferior to those of the traditional plastic materials. Therefore, some product applications, such as spinning fibers, are still subject to certain limitations. In addition, the traditional plastic materials have problems of being difficult to be decomposed by microorganisms, which can cause environmental pollution, etc.

SUMMARY OF THE DISCLOSURE

In response to the above-referenced technical inadequacies, the present disclosure provides a biodegradable additive, a biodegradable polyester fiber and a method for producing the same, and a biodegradable fabric.

In one aspect, the present disclosure provides a biodegradable additive including a polyester resin material and a biodegradable resin material. The biodegradable resin material is at least one material selected from the group consisting of polybutylene succinate (PBS), polybutylene adipate terephthalate (PBAT), polycaprolactone (PCL), polylactic acid (PLA), and derivatives thereof. In the biodegradable additive, a content range of the polyester resin material is between 40 wt % and 80 wt %, and a content range of the biodegradable resin material is between 20 wt % and 60 wt %.

In another aspect, the present disclosure provides a biodegradable polyester fiber, which is formed through a melt spinning process. The biodegradable polyester fiber includes a polyester resin matrix and a biodegradable additive mixed with the polyester resin matrix through the melt spinning process. The biodegradable additive includes a polyester resin material and a biodegradable resin material. The biodegradable resin material is at least one material selected from the group consisting of polybutylene succinate (PBS), polybutylene adipate terephthalate (PBAT), polycaprolactone (PCL), polylactic acid (PLA), and derivatives thereof. In the biodegradable additive, a content range of the polyester resin material is between 40 wt % and 80 wt %, and a content range of the biodegradable resin material is between 20 wt % and 60 wt %. In addition, a weight ratio of the biodegradable additive and the polyester resin matrix is between 1 to 10:100.

In yet another aspect, the present disclosure provides a method for producing a biodegradable polyester fiber, which includes: providing a regular polyester chip, in which a material composition of the regular polyester chip is mainly a polyester resin matrix; providing a biodegradable polyester master-batch, in which a material composition of the biodegradable polyester master-batch includes a polyester resin material and a biodegradable resin material, and the biodegradable resin material is at least one material selected from the group consisting of polybutylene succinate (PBS), polybutylene adipate terephthalate (PBAT), polycaprolactone (PCL), polylactic acid (PLA), and derivatives thereof; and performing a melt spinning process on the regular polyester chip and the biodegradable polyester master-batch to form a biodegradable polyester fiber, in which a weight ratio of the biodegradable polyester master-batch and the regular polyester chip is between 1 to 10:100.

In still yet another aspect, the present disclosure provides a biodegradable fabric formed by interlacing multiple ones of the biodegradable polyester fiber as described above.

Therefore, one of the beneficial effects of the present disclosure is that, in the biodegradable additive, the biodegradable polyester fiber and the method for producing the same, and the biodegradable fabric provided by present disclosure, by virtue of "the biodegradable additive including the polyester resin material and the biodegradable resin material" and "selecting the material type and content range of the biodegradable resin material", general plastic resin materials are able to have biodegradable material properties by adding specific types of the biodegradable additive, and do not sacrifice their original material properties. In this way, environmental hazards caused by the above-mentioned materials will be reduced, thereby significantly improving commercial application values of the above-mentioned materials.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
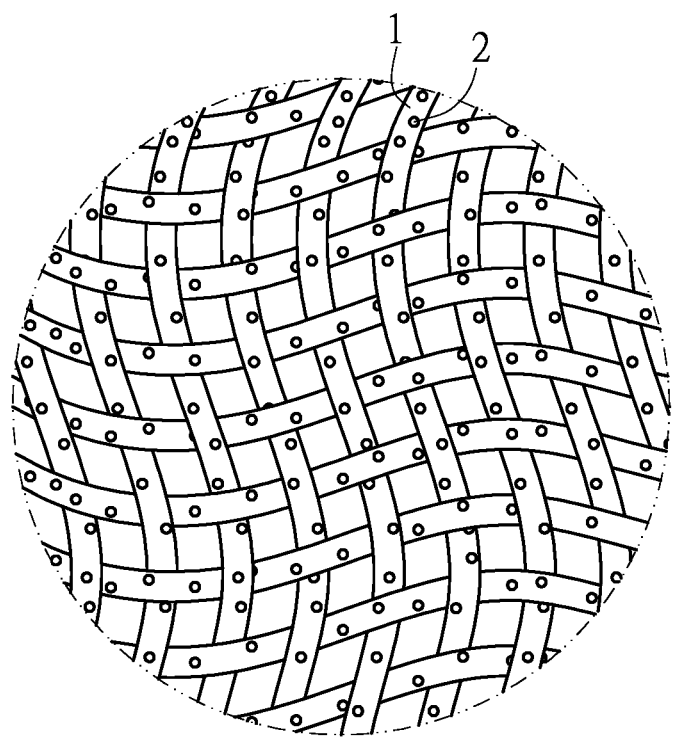
FIG. 1 is a perspective view of a biodegradable polyester fiber according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Biodegradable Additive

An embodiment of the present disclosure provides a biodegradable additive. The biodegradable additive includes a polyester resin material and a biodegradable resin material dispersed in the polyester resin material.

In terms of material selection, the polyester resin material is at least one material selected from the group consisting of polyethylene terephthalate (PET), polytrimethylene terephthalate (PTT), polybutylene terephthalate (PBT), polyethylene naphthalate (PEN), and derivatives thereof.

Preferably, the polyester resin material is at least one material selected from the group consisting of polyethylene terephthalate (PET) and polybutylene terephthalate (PBT). More preferably, the polyester resin material is polyethylene terephthalate (PET).

In terms of material selection, the biodegradable resin material is at least one material selected from the group consisting of polybutylene succinate (PBS), polybutylene adipate terephthalate (PBAT), polycaprolactone (PCL), polylactic acid (PLA), and derivatives thereof.

Preferably, the biodegradable resin material is a resin material having an ester group in its molecular structure. For example, the biodegradable resin material is at least one material selected from the group consisting of polybutylene succinate (PBS), polybutylene adipate terephthalate (PBAT), and polycaprolactone (PCL). More preferably, the biodegradable resin material is at least one material selected from the group consisting of polybutylene succinate (PBS) and polybutylene adipate terephthalate (PBAT).

According to the above configuration, since a molecular structure of the polyester resin material has an ester group and a molecular structure of the biodegradable resin material also has an ester group, compatibility and dispersion performance between the polyester resin material and the biodegradable resin material can be effectively improved.

It is worth mentioning that the polybutylene succinate (PBS) and polybutylene adipate terephthalate (PBAT) of the biodegradable resin material have high degrees of similarity in molecular structure with the polyethylene terephthalate (PET) and polybutylene terephthalate (PBT) of the polyester resin material. Accordingly, the biodegradable resin material can have better compatibility with the polyester resin material.

In addition, it is worth mentioning that, in the above-mentioned biodegradable resin material, the polybutylene succinate (PBS), polybutylene adipate terephthalate (PBAT), and polycaprolactone (PCL) are all petroleum-based biodegradable plastic materials.

Compared with general bio-based biodegradable plastic materials (such as polylactic acid (PLA)), these petroleum-based biodegradable plastic materials have better thermal stability, mechanical strength, and processability. Furthermore, these petroleum-based biodegradable plastic materials also have excellent biodegradability. Accordingly, applying these petroleum-based biodegradable plastic materials on the biodegradable additive allows the biodegradable additive to have good application prospects.

Furthermore, in the biodegradable additive, a content range of the polyester resin material is between 40 wt % and 80 wt %, and a content range of the biodegradable resin material is between 20 wt % and 60 wt %. Preferably, the content range of the polyester resin material is between 40 wt % and 65 wt %, and the content range of the biodegradable resin material is between 35 wt % and 60 wt %.

According to the above configuration, the biodegradable resin material can be more uniformly dispersed in the polyester resin material, and can sufficiently allow the material to have biodegradability in the polyester resin material.

If the content range of the biodegradable resin material is less than a lower limit of the above-mentioned content range (i.e., less than 20 wt %), the biodegradable resin material cannot sufficiently allow the material to have biodegradability. In addition, if the content range of the biodegradable resin material is greater than an upper limit of the above-mentioned content range (i.e., greater than 60 wt %), the biodegradable resin material cannot be uniformly dispersed in the polyester resin material.

In an embodiment of the present disclosure, the biodegradable additive further includes a microbial attractant, and the microbial attractant is at least one material selected from the group consisting of a sugar and an alcohol. In the biodegradable additive, a content range of the microbial attractant is between 0.1 wt % and 1 wt %.

In terms of material selection, the sugar can be, for example, at least one of sucrose, fructose, galactose, and glucose. In addition, the alcohol can be, for example, at least one of xylitol, sorbitol, and mannitol. However, the present disclosure is not limited thereto.

The use of the microbial attractant is to provide an energy source required by microorganisms (i.e., aerobic microorganisms or anaerobic microorganisms), so that the microorganisms are attracted to surroundings of the resin material and absorb the energy source from the microbial attractant. At the same time, the microorganisms can decompose the biodegradable resin material. In addition, when the microorganisms decompose the biodegradable resin material (i.e., PBS, PBAT, or PCL), the microorganisms can also decompose the polyester resin material (i.e., PET or PBT). As a result, the biodegradability of the polyester resin material can also be improved.

In an embodiment of the present disclosure, there is a preferred range for each of an intrinsic viscosity (IV) of the polyester resin material and an intrinsic viscosity of the biodegradable resin material. Specifically, the polyester resin material has a first intrinsic viscosity, the biodegradable resin material has a second intrinsic viscosity, and the second intrinsic viscosity is greater than the first intrinsic viscosity.

The first intrinsic viscosity of the polyester resin material is preferably between 0.5 dL/g and 0.9 dL/g, and more preferably between 0.6 dL/g and 0.8 dL/g. Furthermore, the second intrinsic viscosity of the biodegradable resin material is between 0.8 dL/g and 1.2 dL/g, and more preferably between 0.9 dL/g and 1.1 dL/g.

Furthermore, by adjusting the content ranges of the polyester resin material and the biodegradable resin material, the biodegradable additive has an overall intrinsic viscosity of between 0.8 dL/g and 1.0 dL/g, and more preferably between 0.8 dL/g and 0.9 dL/g.

According to the above configuration, the biodegradable additive of the present embodiment can have an enhanced overall intrinsic viscosity by mixing the biodegradable resin material into the polyester resin material, thereby improving material applicability. For example, if the biodegradable additive of the present embodiment is mixed with a regular polyester chip to produce a polyester fiber, not only can the polyester fiber have the biodegradability, but the fiber strength of the polyester fiber can also be improved.

In an embodiment of the present disclosure, the biodegradable resin material of the biodegradable additive simultaneously includes different biodegradable resins, and the different biodegradable resins are mixed with a specific ratio. Accordingly, the biodegradable additive can be formed into a biodegradable polyester master-batch by means of granulation.

More specifically, the biodegradable resin material includes a first biodegradable resin, a second biodegradable resin, and a third biodegradable resin.

The first biodegradable resin is polybutylene succinate (PBS), the second biodegradable resin is polycaprolactone (PCL), and the third biodegradable resin is polybutylene adipate terephthalate (PBAT).

Furthermore, a weight ratio of the polyester resin material (PET), the first biodegradable resin (PBS), the second biodegradable resin (PCL), and the third biodegradable resin (PBAT) is preferably between 40 to 65:5 to 30:5 to 30:4 to 12, and more preferably between 40 to 60:10 to 20:10 to 20:5 to 10.

According to the above configuration, the biodegradable additive can be formed into a biodegradable polyester master-batch by a granulating process through a twin-screw extruder. In the biodegradable polyester master-batch, the above-mentioned different biodegradable resins are uniformly mixed with each other. Furthermore, under the condition of the above-mentioned weight ratio range, the compatibility between the different biodegradable resins can be improved by the biodegradable additive without adding of any additional compatibilizer.

It is worth mentioning that, in the present embodiment, the above-mentioned biodegradable resin material of the biodegradable additive does not include polylactic acid (PLA), but the present disclosure is not limited thereto.

In the biodegradable additive of the present embodiment, the polyester resin material and the biodegradable resin material are both capable of being decomposed by the microorganisms in an anaerobic environment or an aerobic environment, and a biodegradable rate of the biodegradable resin material is greater than that of the polyester resin material.

In practical applications, the biodegradable additive of the present embodiment can be added to general plastic materials, such as polyester (PET), polyethylene (PE), polypropylene (PP), polystyrene (PS), and polyvinyl chloride (PVC). Accordingly, the general plastic materials can also have the biodegradability, and end products (i.e., spun fibers) made of the plastic materials can also have the biodegradability.

Biodegradable Polyester Fiber

The above is a description of material characteristics of the biodegradable additive according to the embodiment of the present disclosure, and material applications of the biodegradable additive will be described below.

As shown in FIG. 1, a biodegradable polyester fiber F is provided according to an embodiment of the present disclosure. The biodegradable polyester fiber F is formed through a melt spinning process.

The biodegradable polyester fiber F includes a polyester resin matrix 1 and a biodegradable additive 2. The biodegradable additive 2 is mixed with the polyester resin matrix 1 through the melt spinning process.

The biodegradable additive 2 includes a polyester resin material and a biodegradable resin material. The polyester resin material is at least one material selected from the group consisting of polyethylene terephthalate (PET), polytrimethylene terephthalate (PTT), polybutylene terephthalate (PBT), polyethylene naphthalate (PEN), and derivatives thereof. In addition, the biodegradable resin material is at least one material selected from the group consisting of polybutylene succinate (PBS), polybutylene adipate terephthalate (PBAT), polycaprolactone (PCL), polylactic acid (PLA), and derivatives thereof.

In the biodegradable additive, a content range of the polyester resin material is between 40 wt % and 80 wt %, and a content range of the biodegradable resin material is between 20 wt % and 60 wt %.

Furthermore, a weight ratio of the biodegradable additive and the polyester resin matrix is preferably between 1 to 10:100, and more preferably between 2 to 5:100. That is, the biodegradable additive is added in a trace amount (i.e., less than 10 wt %) in the biodegradable polyester fiber.

The biodegradable additive is added to the polyester resin matrix under the condition of the above-mentioned weight ratio range, and can be uniformly dispersed in the polyester resin matrix and exert its biodegradable characteristics.

It is worth mentioning that the polyester resin matrix 1 is formed by a regular polyester chip through the melt spinning process, and the biodegradable additive 2 is dispersed into the polyester resin matrix 1 from a biodegradable polyester master-batch through the melt spinning process. In addition, the regular polyester chip refers to a polyester material that includes only the polyester but not any biodegradable resin in its material composition.

In addition, it is worth mentioning that, since the main materials of the polyester resin matrix 1 and the biodegradable additive 2 are both the polyester, the polyester resin matrix 1 and the biodegradable additive 2 have good compatibility with each other. Therefore, the biodegradable additive 2 can be uniformly dispersed into the polyester resin matrix 1.

According to the above configuration, the biodegradable polyester fiber preferably has a biodegradation rate of not less than 2.2%, and more preferably not less than 5%, by being tested in accordance with ASTM D6691 standard test method.

Method for Producing Biodegradable Polyester Fiber

The above is a description of material characteristics of the biodegradable polyester fiber according to the embodiment of the present disclosure, and a method for producing the biodegradable polyester fiber will be described below. It should be noted that the above-mentioned biodegradable polyester fiber can be realized by the method for producing the biodegradable polyester fiber of the present embodiment, but the present disclosure is not limited thereto.

Figure 2:
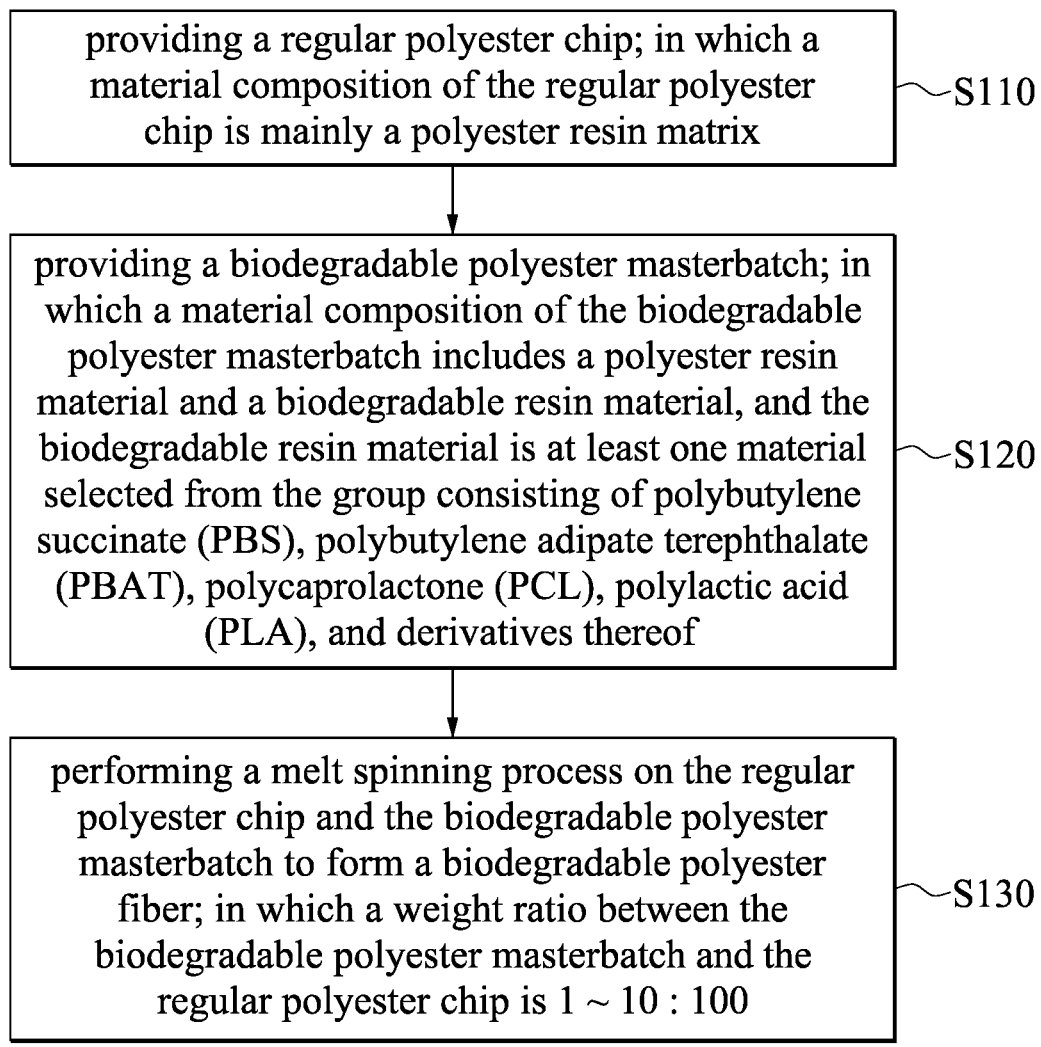
FIG. 2 is a flowchart of a method for producing the biodegradable polyester fiber according to one embodiment of the present disclosure.

As shown in FIG. 2, the method for producing the biodegradable polyester fiber is provided according to the embodiment of the present disclosure. The method for producing the biodegradable polyester fiber includes step S110, step S120, and step S130. It should be noted that a sequence of the steps and an actual manner of operation described in the present embodiment can be adjusted according to requirements and are not limited to those described in the present embodiment.

The step S110 includes: providing a regular polyester chip, in which a material composition of the regular polyester chip is mainly a polyester resin matrix (i.e., greater than 90 wt % of polyester in the regular polyester chip).

The step S120 includes: providing a biodegradable polyester master-batch, in which a material composition of the biodegradable polyester master-batch includes a polyester resin material and a biodegradable resin material, and the biodegradable resin material is at least one material selected from the group consisting of polybutylene succinate (PBS), polybutylene adipate terephthalate (PBAT), polycaprolactone (PCL), polylactic acid (PLA), and derivatives thereof.

The step S130 includes: performing a melt spinning process on the regular polyester chip and the biodegradable polyester master-batch to form a biodegradable polyester fiber, in which a weight ratio of the biodegradable polyester master-batch and the regular polyester chip is preferably between 1 to 10:100, and more preferably between 2 to 5:100.

Experimental Data Test

Hereinafter, a more detailed description will be provided by referring to Exemplary Examples 1 to 11 and Comparative Example 1. However, the following examples are only provided to aid in understanding of the present disclosure, and is not to be construed as limiting the scope of the present disclosure.

Exemplary Example 1 takes formula A in Table 1 as an example. Preparation of Exemplary Example 1 includes: adding 2 wt % of master-batches including a composition of the formula A in a polyester spinning process to obtain a partial oriented yarn (POY). Next, the partial oriented yarn (POY) is subjected to a false twist process to form a draw textured yarn (DTY). The draw textured yarn (DTY) undergoes a yarn strength test and a biodegradability test, so as to obtain test data. The test data is shown in Table 2, and the number of the test data is R1.

Exemplary Example 2 takes the formula A in Table 1 as an example. Preparation of Exemplary Example 2 includes: adding 5 wt % of master-batches including the composition of the formula A in the polyester spinning process to obtain a partial oriented yarn (POY). Next, the partial oriented yarn (POY) is subjected to the false twist process to form a draw textured yarn (DTY). The draw textured yarn (DTY) undergoes the yarn strength test and the biodegradability test, so as to obtain test data. The test data is shown in Table 2, and the number of the test data is R2.

Exemplary Example 3 takes formula B in Table 1 as an example. Preparation of Exemplary Example 3 includes: adding 2 wt % of master-batches including a composition of the formula B in the polyester spinning process to obtain a partial oriented yarn (POY). Next, the partial oriented yarn (POY) is subjected to the false twist process to form a draw textured yarn (DTY). The draw textured yarn (DTY) undergoes the yarn strength test and the biodegradability test, so as to obtain test data. The test data is shown in Table 2, and the number of the test data is R3.

Exemplary Example 4 takes the formula B in Table 1 as an example. Preparation of Exemplary Example 4 includes: adding 5 wt % of master-batches including the composition of the formula B in the polyester spinning process to obtain a partial oriented yarn (POY). Next, the partial oriented yarn (POY) is subjected to the false twist process to form a draw textured yarn (DTY). The draw textured yarn (DTY) undergoes the yarn strength test and the biodegradability test, so as to obtain test data. The test data is shown in Table 2, and the number of the test data is R4.

Preparations of Exemplary Examples 5 to 11 include: respectively adding master-batches including compositions of formulas C to I in Table 1; and performing the polyester spinning process and the false twist process. The test data is shown in Table 2, and the numbers of the test data are R5 to R11.

Comparative Example 1 takes general polyester fibers as an example. Preparation of Comparative Example 1 includes: adding polyester chips that do not include the biodegradable resin in the polyester spinning process to obtain a partial oriented yarn (POY). Next, the partial oriented yarn (POY) is subjected to the false twist process to form a draw textured yarn (DTY). The draw textured yarn (DTY) is tested by the yarn strength test and the biodegradability test to obtain a test data, the test data is shown in Table 2, and the number of the test data is R0.

TABLE 1

[Masterbatch Formula of Biodegradable Additive]

| Formula Number | Item Formula (PHR) | | | | | | | | |
|---|---|---|---|---|---|---|---|---|---|
| | A | B | C | D | E | F | G | H | I |
| PET | 61 | 61 | 61 | 61 | 61 | 61 | 61 | 50 | 40 |
| PBS | 14 | 14 | 39 | — | — | 30 | 5 | 18 | 26 |
| PCL | 17 | 17 | — | 39 | — | 5 | 30 | 22 | 22 |
| PBAT | 8 | 8 | — | — | 39 | 4 | 4 | 10 | 12 |
| Attractant | — | 0.3 | — | — | — | — | — | — | — |

TABLE 2

[Analysis of Physical Properties and Biodegradation Rate]

| | Item | | | | | | | | | | | |
|---|---|---|---|---|---|---|---|---|---|---|---|---|
| | Blank | A | A | B | B | C | D | E | F | G | H | I |
| | | | | | | Formula Number | | | | | | |
| | R0 | R1 | R2 | R3 | R4 | R5 | R6 | R7 | R8 | R9 | R10 | R11 |
| Denier (d) | 75.4 | 76.1 | 76.1 | 76.8 | 76.8 | 75.9 | 76.2 | 76.3 | 75.2 | 75.3 | 76.7 | 76.5 |
| Yarn strength (g/d) | 4.02 | 4.19 | 4.33 | 4.17 | 4.14 | 4.10 | 4.11 | 4.08 | 4.20 | 4.01 | 3.95 | 4.01 |
| Elongation rate (%) | 19.2 | 18.8 | 21.9 | 21.4 | 24.4 | 21.0 | 19.81 | 22.1 | 19.47 | 21.6 | 22.5 | 21.5 |
| Biodegradable rate %[*1] | 1.74 | 5.12 | 6.42 | 5.37 | 6.78 | 5.10 | 2.58 | 2.34 | 3.62 | 2.71 | 2.87 | 3.86 |
| Added amount of masterbatch | — | 2% | 5% | 2% | 5% | 2% | 2% | 2% | 2% | 2% | 2% | 2% |

[*1] The biodegradable rate is obtained according to the ASTM D6691 standard test method.

According to the above experimental data, the biodegradation rates of the polyester fibers of Exemplary Examples 1 to 11 (R1 to R11) are all not less than 2.2% when tested according to the ASTM D6691 standard test method.

In addition, in a preferred embodiment, the polyester fibers of Exemplary Examples 1 to 4 (R1 to R4) all have the biodegradation rates of not less than 5%.

Biodegradable Fabric

As shown in FIG. 1, an embodiment of the present disclosure further provides a biodegradable fabric formed by interlacing multiple ones of the biodegradable polyester fiber as described in the above embodiment.

Beneficial Effects of the Embodiments

In conclusion, one of the beneficial effects of the present disclosure is that, in the biodegradable additive, the biodegradable polyester fiber and the method for producing the same, and the biodegradable fabric provided by present disclosure, by virtue of "the biodegradable additive including the polyester resin material and the biodegradable resin material" and "selecting the material type and content range of the biodegradable resin material", general plastic resin materials are able to have biodegradable material properties by adding specific types of the biodegradable additive, and do not sacrifice their original material properties. In this way, environmental hazards caused by the above-mentioned materials will be reduced, thereby significantly improving commercial application values of the above-mentioned materials.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A biodegradable polyester fiber, which is formed through a melt spinning process, the biodegradable polyester fiber comprising:
   a polyester resin matrix; and
   a biodegradable additive being mixed with the polyester resin matrix through the melt spinning process, wherein the biodegradable additive includes:
      a polyester resin material; wherein the polyester resin material is polyethylene terephthalate (PET); wherein the polyester resin material has a first intrinsic viscosity of between 0.6 dL/g and 0.8 dL/g; and
      a biodegradable resin material, wherein the biodegradable resin material includes polybutylene succinate (PBS), polybutylene adipate terephthalate (PBAT), and polycaprolactone (PCL); wherein the biodegradable resin material has a second intrinsic viscosity of between 0.9 dL/g and 1.1 dL/g;
   wherein, in the biodegradable additive, a weight ratio among polyethylene terephthalate (PET), polybutylene succinate (PBS), polycaprolactone (PCL), and polybutylene adipate terephthalate (PBAT) is 61:14:17:8;

wherein a content of the biodegradable additive added into the polyester resin matrix is 2 wt % or 5 wt %.

2. The biodegradable polyester fiber according to claim 1, wherein the polyester resin matrix is formed by a regular polyester chip through the melt spinning process, and the biodegradable additive is dispersed into the polyester resin matrix from a biodegradable polyester master-batch through the melt spinning process.

3. The biodegradable polyester fiber according to claim 1, wherein the biodegradable additive further includes a microbial attractant; wherein the microbial attractant is at least one material selected from the group consisting of a sugar and an alcohol; wherein, in the biodegradable additive, a content range of the microbial attractant is between 0.1 wt % and 1 wt %.

4. The biodegradable polyester fiber according to claim 1, wherein the biodegradable resin material does not include polylactic acid (PLA).

5. The biodegradable polyester fiber according to claim 1, wherein the biodegradable polyester fiber has a biodegradation rate of not less than 2.2% when tested according to ASTM D6691 standard test method.

6. A biodegradable fabric formed by interlacing multiple ones of the biodegradable polyester fiber as claimed in claim 1.

\* \* \* \* \*